(12) United States Patent
Wanke et al.

(10) Patent No.: US 8,714,636 B2
(45) Date of Patent: May 6, 2014

(54) CHASSIS STRUCTURE OF A MOTOR VEHICLE BODY

(75) Inventors: Thomas Wanke, Gau-Odernheim (DE);
Udo Mildner, Limburg (DE);
Franz-Josef Ringel, Mainz (DE)

(73) Assignee: GM Global Technology Operations LLC, Detroit, MI (US)

(*) Notice: Subject to any disclaimer, the term of this patent is extended or adjusted under 35 U.S.C. 154(b) by 369 days.

(21) Appl. No.: 12/960,222

(22) Filed: Dec. 3, 2010

(65) Prior Publication Data

US 2011/0133518 A1    Jun. 9, 2011

(30) Foreign Application Priority Data

Dec. 3, 2009  (DE) .......................... 10 2009 056 840

(51) Int. Cl.
*B60J 7/00* (2006.01)

(52) U.S. Cl.
USPC .................................................... 296/203.02

(58) Field of Classification Search
USPC ................... 296/203.02, 204; 405/195.1, 224
See application file for complete search history.

(56) References Cited

U.S. PATENT DOCUMENTS

| | | | | |
|---|---|---|---|---|
| 1,220,999 A | * | 3/1917 | Booth ......................... | 296/181.7 |
| 2,254,458 A | * | 9/1941 | Swallow ...................... | 296/191 |
| 2,637,592 A | * | 5/1953 | Karlby ....................... | 296/193.01 |
| 2,908,528 A | * | 10/1959 | Richter ....................... | 296/181.4 |
| 3,021,172 A | * | 2/1962 | Fiala et al. ................. | 296/193.01 |
| 3,423,122 A | * | 1/1969 | Wessells ..................... | 296/203.01 |
| 3,423,123 A | * | 1/1969 | Wessells ..................... | 296/203.01 |
| 3,718,364 A | * | 2/1973 | Fischer et al. .............. | 296/187.09 |
| 3,944,276 A | * | 3/1976 | de Rosa et al. ............. | 296/65.13 |
| 4,382,626 A | * | 5/1983 | Spooner ..................... | 296/181.2 |
| 4,557,519 A | * | 12/1985 | Matsuura .................... | 296/204 |
| 4,747,636 A | * | 5/1988 | Harasaki et al. ............ | 296/181.4 |
| 4,865,378 A | * | 9/1989 | Filtri et al. ................ | 296/193.07 |
| 4,892,350 A | * | 1/1990 | Kijima ....................... | 296/204 |
| 4,900,083 A | * | 2/1990 | Kumasaka et al. ......... | 296/193.04 |
| 4,940,282 A | * | 7/1990 | Townsend .................. | 296/204 |
| 5,125,715 A | * | 6/1992 | Kijima ....................... | 296/187.09 |
| 5,129,700 A | * | 7/1992 | Trevisan et al. | |
| 5,388,885 A | * | 2/1995 | Warren ...................... | 296/203.03 |
| 5,788,322 A | * | 8/1998 | Wolf et al. ................. | 296/181.4 |
| 5,803,533 A | * | 9/1998 | Schulz et al. .............. | 296/204 |

(Continued)

FOREIGN PATENT DOCUMENTS

DE          3722490 C2    10/1989
DE     102005026075 A1   12/2006

(Continued)

OTHER PUBLICATIONS

German Patent Office, German Search Report for German Application No. 102009056840.9, Nov. 24, 2010.

(Continued)

*Primary Examiner* — Kiran B Patel
(74) *Attorney, Agent, or Firm* — Ingrassia Fisher & Lorenz, P.C.

(57) ABSTRACT

A bearing structure arrangement of a motor vehicle body is provided with at least one bearing structure component extending essentially in the longitudinal direction of the vehicle, which is provided in the interior or dry area of the motor vehicle to form a single-piece connection between the vehicle front wall and a rear frame of the body.

18 Claims, 5 Drawing Sheets

(56) References Cited

U.S. PATENT DOCUMENTS

| | | | |
|---|---|---|---|
| 5,806,918 A * | 9/1998 | Kanazawa | 296/204 |
| 5,881,458 A * | 3/1999 | Wolf et al. | 29/897.2 |
| 5,921,618 A * | 7/1999 | Mori et al. | 296/187.12 |
| 5,934,745 A * | 8/1999 | Moore et al. | 296/193.04 |
| 5,988,734 A * | 11/1999 | Longo et al. | 296/203.01 |
| 6,007,145 A * | 12/1999 | Tezuka | 296/204 |
| 6,540,286 B2 * | 4/2003 | Takemoto et al. | 296/204 |
| 6,568,745 B2 * | 5/2003 | Kosuge et al. | 296/193.02 |
| 6,705,667 B1 * | 3/2004 | Bartesch et al. | 296/187.01 |
| 6,857,692 B2 * | 2/2005 | Cardimen et al. | 296/204 |
| 7,264,304 B2 * | 9/2007 | Carcioffi | 296/193.04 |
| 7,310,878 B2 * | 12/2007 | Chernoff et al. | 29/897.2 |
| 7,331,626 B2 * | 2/2008 | Yoshimoto et al. | 296/187.12 |
| 7,677,649 B2 * | 3/2010 | Hedderly | 296/193.07 |
| 7,703,841 B2 * | 4/2010 | Hedderly | 296/193.04 |
| 7,717,465 B2 * | 5/2010 | Hedderly | 280/784 |
| 7,849,601 B2 * | 12/2010 | Hedderly | 29/897.2 |
| 8,038,205 B2 * | 10/2011 | Hedderly | 296/203.03 |
| 2001/0019216 A1 * | 9/2001 | Kobayashi | 296/204 |
| 2002/0057004 A1 * | 5/2002 | Corcoran et al. | 296/203.01 |
| 2002/0145307 A1 * | 10/2002 | Fujita | 296/193 |
| 2002/0163225 A1 * | 11/2002 | Glashagel et al. | 296/203.01 |
| 2002/0195840 A1 * | 12/2002 | Mishima et al. | 296/203.01 |
| 2005/0057077 A1 * | 3/2005 | Telehowski et al. | 296/203.03 |
| 2005/0161981 A1 | 7/2005 | Chernoff et al. | |
| 2005/0189791 A1 | 9/2005 | Chernoff et al. | |
| 2009/0091159 A1 | 4/2009 | Gerish | |
| 2009/0102238 A1 | 4/2009 | Gomi | |
| 2009/0242086 A1 * | 10/2009 | Thomas et al. | 148/654 |
| 2010/0078969 A1 * | 4/2010 | Boettcher et al. | 296/193.09 |
| 2011/0241386 A1 * | 10/2011 | Mildner et al. | 296/204 |
| 2011/0266838 A1 * | 11/2011 | Leopold | 296/193.07 |
| 2011/0298246 A1 * | 12/2011 | Mildner | 296/193.07 |
| 2012/0068499 A1 * | 3/2012 | Mildner et al. | 296/193.07 |
| 2012/0091777 A1 * | 4/2012 | Mildner et al. | 297/378.1 |
| 2012/0119545 A1 * | 5/2012 | Mildner et al. | 296/193.07 |
| 2012/0139297 A1 * | 6/2012 | Mildner et al. | 296/204 |
| 2012/0180910 A1 * | 7/2012 | Thomas et al. | 148/531 |

FOREIGN PATENT DOCUMENTS

| | | |
|---|---|---|
| DE | 102006052381 A1 | 5/2008 |
| EP | 0298903 A2 | 1/1989 |
| EP | 0433903 A1 | 6/1991 |

OTHER PUBLICATIONS

British Patent Office, British Search Report for British Application No. 1020387.5, Mar. 10, 2011.

* cited by examiner

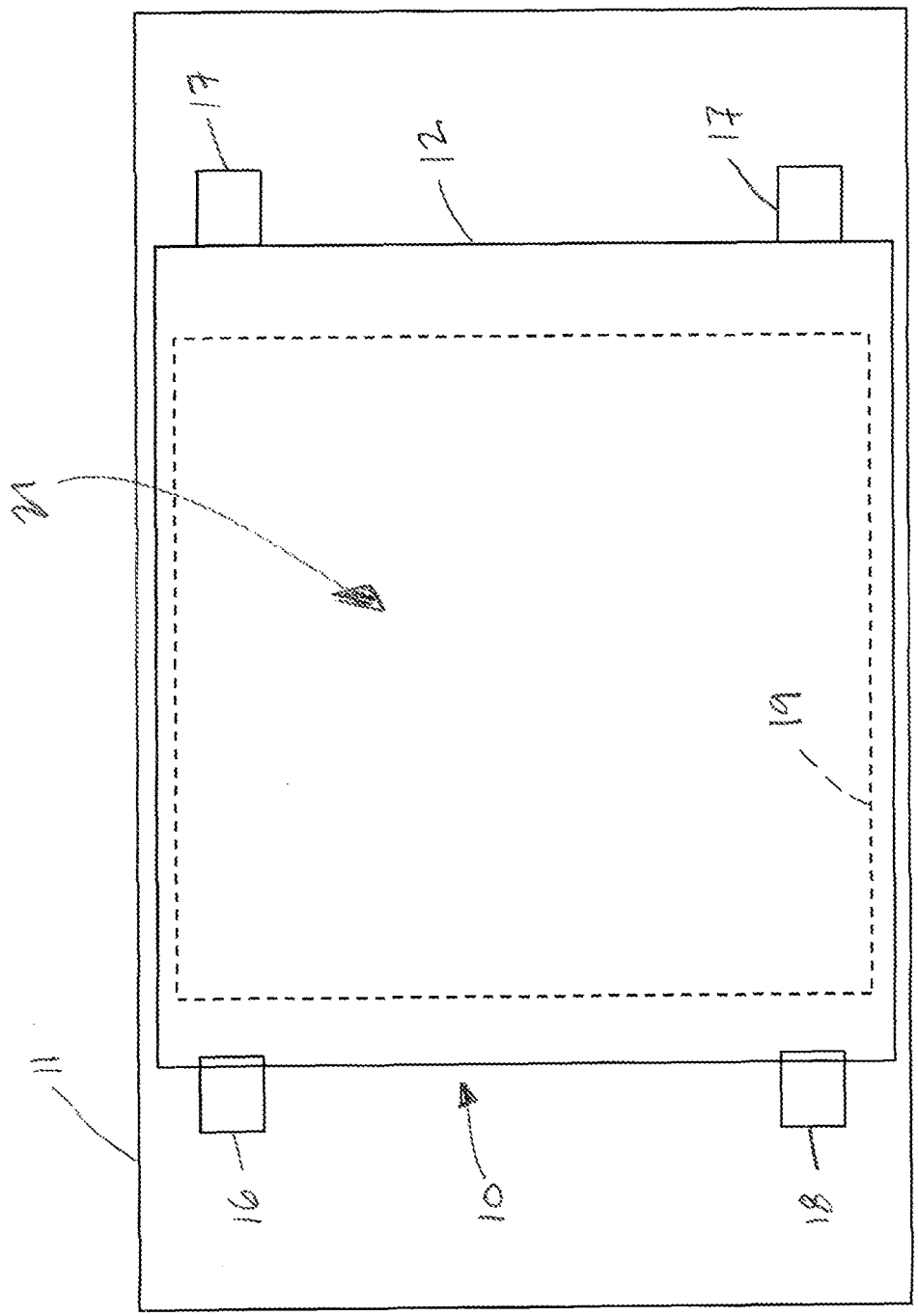

CHASSIS STRUCTURE OF A MOTOR VEHICLE BODY

CROSS-REFERENCE TO RELATED APPLICATION

This application claims priority to German Patent Application No. 102009056840.9, filed Dec. 3, 2009, which is incorporated herein by reference in its entirety.

TECHNICAL FIELD

The technical field relates to a bearing structure arrangement, in particular to a chassis structure of a motor vehicle body, and especially a floor structure of a motor vehicle or motor vehicle body to be arranged under a passenger cabin. In addition, the technical field relates to a motor vehicle equipped with this bearing structure arrangement.

BACKGROUND

On the one hand, bearing structure components of motor vehicle bodies, such as a front frame, a rear frame, frame side rail, as well as front and rear underbody, perform a static function, in that they absorb the vehicle weight, or the weight of individual vehicle components, like the engine. On the other hand, at least some of these components are to exhibit a defined deformation behavior in the event of extreme mechanical loads, e.g., during a vehicular collision.

The geometric configuration of individual bearing structure components in a vehicle body along with their mechanical interconnection define so-called load paths, along which impact energy that arises during a collision can be diverted in as defined a manner as possible. Load paths also serve the purpose of not just absorbing the impact energy caused by the collision, but also to keep the acting forces away from the passenger cabin, so that the latter can perform its function as a survival area for the vehicle passengers, even in the event of serious vehicular collisions.

In addition to the mechanical load requirements to be satisfied, there are constant efforts to reduce the weight of the vehicle body and motor vehicle as a whole to minimize fuel consumption. For example, DE 10 2006 052 381 A1 discloses a side frame rail for an underbody of a passenger vehicle body, of which at least a partial section is designed as a roll profile. The partial section designed as a roll profile can here incorporate a material overlap with two chambers, which can reinforce the frame side rail.

In addition, consideration can be given to the use of lightweight structural materials in body construction as a weight-saving measure. Suitable lightweight structural materials include compression-hardened components made of steel or sheet steel, as well as the use of metal sheets having a high percentage of light metals, such as magnesium or aluminum, or consist entirely of such comparatively light materials with a low density. However, such lightweight structural materials can only be conditionally used for the outside components of a motor vehicle body, such as front frames, rear frames, frame side rails or cross members, given their only moderate corrosion resistance.

Bearing structure components made of lightweight aluminum or magnesium as well as compression-hardened steel sheets must always be provided with a protective layer against corrosion for use on the outside of motor vehicles. However, thermal loads in the molding process make it virtually impossible to apply a protective layer, e.g., via zinc plating, for example for compression-hardened steel sheets. In addition, the application of a metal protective layer is always associated with an increase in weight and rise in costs.

Due to the frame profiles lying in the area that gets splashed with water and their trimmed edges, conventional front frame structures of vehicle bodies are especially susceptible to corrosion. Any flanged trim on the frame profiles must be additionally sealed.

In order to optimize the vehicle acoustics, in particular relative to noise dampening, it is further necessary to provide the underbody structure of the vehicle body with an acoustic insulation layer. The thickness of this insulation layer is here determined by the acoustic dampening requirements, so that the frame elongation determining the profile height of the front frame and running in the wet or splash water area under the vehicle floor can only be conditionally diminished in terms of its bodywork height.

In addition, it proves disadvantageous in prior art to manufacture an underbody structure by individually joining a plurality of respectively separate structural and cladding components with the vehicle body. This type of manufacture and assembly is always associated with comparatively high production effort and production costs.

Therefore, at least one object of the present invention is to provide a bearing structure arrangement of a motor vehicle body that satisfies the mechanical load requirements, has a comparatively lower weight, can be manufactured at minimized costs, and enables the creation of additional installation space inside the motor vehicle.

SUMMARY

The object underlying the invention is achieved with a bearing structure arrangement of a motor vehicle body preferably designed as an underbody structure, as well as with a motor vehicle.

The bearing structure arrangement according to an embodiment of the invention is provided for a motor vehicle body or designed as a component of the motor vehicle body. The bearing structure according to an embodiment of the invention can here have several individual components of the motor vehicle that have already been modularly joined together or permanently interconnected, such as frame side rails and cross members, front and/or rear frames and their frame sections, A-, B-, C- or D-columns, as well as side skirts and splash walls and/or vertical sheeting or comparable bearing structure components.

The bearing structure arrangement according to an embodiment of the invention is characterized by a bearing structure component extending essentially in the longitudinal direction of the vehicle, which is provided in the interior or dry area of the motor vehicle to form an one-piece connection between the vehicle front wall or splash wall and a rear frame or rear frame nodes of the vehicle body. The one-piece bearing structure component here extends from the front frame to the rear frame of the vehicle, typically from the splash wall to the vertical sheeting of the vehicle body. As a result, it spans the entire floor section of a vehicle body lying under a passenger cabin. The bearing structure arrangement according to an embodiment of the invention is here preferably modular in design. Its bearing structure component can preferably be directly or indirectly secured to the front frame of the vehicle body, for example by means of a separating element that separates the wet and dry areas of the vehicle from each other, and similarly to the rear frame of the vehicle body as well.

Another advantageous embodiment of the invention provides in particular that the bearing structure component borders a floor plate of the vehicle body toward the bottom. The floor plate here acts as a hermetic separation between the splash water or exterior area and the dry or interior area of the vehicle body. Because the floor plate is situated under the bearing structure component, the bearing components of the underbody structure can be completely accommodated in the dry or interior area of the motor vehicle, making the otherwise required corrosion-inhibiting measures superfluous for these bearing or load path-conveying structural components.

A corrosion-inhibiting layer can be entirely omitted in an advantageous manner for the bearing structure component. Securing the floor plate to the bearing structure component from below further makes it possible to use exclusively structural measures to effectively protect the latter against moisture and other corrosive influences, as well as against contamination. There is now no longer any danger that corrosion will have a deleterious effect on the functionality of the bearing structure component.

In one advantageous further embodiment of the invention, the at least one bearing structure component has profile sections that branch in a longitudinal or transverse direction of the vehicle and/or converge into each other, which in addition are designed toward the floor plate as open profile sections with a U or V-shape. By alternately securing bearing structure components and underlying floor plate, the profile sections of the bearing structure component open toward the bottom can be sealed by the floor plate. In this regard, the floor plate can act as an edge plate for the profile sections of the bearing structure component. It is provided in particular for the bearing structure component that the latter has a cross section toward the front wall that corresponds with the front frame bordering the front wall from outside, and is arranged essentially so as to overlap with the cross section of the front frame at the front or splash wall in a load path-conveying way.

This profile section preferably branches like a Y opposite the traveling direction, i.e., toward the rear, wherein one branch extends to a central tunnel section, and another branch to the side skirt. This branching structure of the profile section of the bearing structure component that operatively interacts with the front frame so as to convey a load path makes it possible to optimize the diversion of crash-induced forces into the central tunnel and the side skirt area.

A preferred embodiment of the invention further provides that the bearing structure component is connected with the floor plate by at least one welding flange running self-contained in the plane of the floor plate. For example, if a profile section of the bearing structure component splits into two branches that again converge or end in another profile component in the longitudinal direction of the vehicle, the bearing structure component has a recess formed by the branched areas.

Because the branching profile sections are connected with the floor plate near the bottom, toward the floor plate, by means of a continuous welding flange, a downwardly closed depression in the bearing structure arrangement comes about given an alternate attachment of the bearing structure component and floor plate, e.g., which is suitable for holding insulation material. This can also increase the installation space available in the vehicle passenger compartment.

Another embodiment of the invention further provides that the bearing structure component can be connected in a load path-conveying manner with a front frame component of the vehicle body lying in the wet area of the vehicle by means of a front attachment section extending at an inclination or transverse to the plane of the floor plate via an attachment section of the floor plate that extends in a corresponding manner, preferably welded thereto when reaching a situation requiring installation on the motor vehicle.

The front attachment section of the floor plate extending at an inclination, preferably upwardly offset, acts as a hermetic separation between the front frame lying in the splash water area, and the bearing structure component overlapping the latter to be arranged in the interior or dry area. It can here be provided in particular that the front attachment section of the floor plate even acts as a splash wall, is designed like an elongation of the latter and/or is connected with the splash wall. The front attachment section of the profile cross section of the interior bearing structure component of the bearing structure arrangement essentially corresponds to the profile cross section of the opposing front frame. The interior bearing structure component can here be designed in particular as a type of elongation of the front frame.

Because the bearing structure component and the front frame overlap each other at least sectionally, and preferably almost completely, a load path passing through both components can be formed, despite the hermetic separation of the interior bearing structure component and exterior front frame. It is here provided in particular that the attachment section of the floor plate extending between the front frame and interior bearing structure component be welded on either side, both on the free end of the front frame and the front end section of the interior bearing structure component.

In another advantageous embodiment of the invention, the interior bearing structure component has a central tunnel section that extends over the entire length of the bearing structure component. The central tunnel section has a downwardly open U or hat profile, and essentially progresses along a straight line over the entire length of the bearing structure component. It preferably extends as a single piece and continuously between the front or splash wall and vertical sheeting or rear frame node of the vehicle body. Based on the embossed area of the bearing structure component designed as a central section, the underlying floor plate can also exhibit a continuous U- or hat-shaped embossed area. Integrating the central tunnel section or a reinforced tunnel into the interior bearing structure component makes it possible to achieve an additional reinforcement of the entire bearing support component and underbody structure in a simple manner.

In another embodiment of the invention, the lateral edges of the interior bearing structure component lying in the transverse direction of the vehicle have upwardly offset or upwardly positioned and mutually opposing edge sections relative to the underlying plane of the floor plate. For example, these edge sections can arise from the profile section of the bearing structure component or be connected as one piece with it. In any event, they impart an elevated torsional stiffness to the bearing structure component.

It can here further be provided that the bearing structure component has at least one seat cross member extending between the central tunnel section and the aforesaid edge sections. Similarly to the central tunnel section, the seat cross member can have a U or hat profile that inwardly projects or is downwardly open toward the floor plate. The seat cross member integrated into the interior bearing structure component provides additional reinforcement for the bearing structure component. In addition, integrating the seat cross member into the interior bearing structure component makes a separate attachment of a seat cross member to the bearing components of a motor vehicle obsolete, thereby saving on costs and assembly outlay.

A further embodiment of the invention further provides that the lateral, preferably upwardly offset edge sections of the interior bearing structure and the edge sections of the floor plate that are also upwardly offset and correspond with the latter are connected with each other by means of lateral floor segments. The floor segments here act as side skirts or side skirt reinforcement, so that an edge-side, closed profile section can be created overall on the opposing side edges of the underbody structure according to the invention from the respective edge sections of the interior bearing structure component, the floor plate as well as the floor segment to be separately connected with the latter. The floor segments here acting as skirt reinforcement are generally also referred to as lateral floor in body construction.

The floor plate acting as the edge plate in the area of the profile sections of the interior bearing structure component is largely designed as a continuous floor or surface segment over the entire extension of the underbody structure according to the invention. It is welded to the interior bearing structure component via a plurality of profile sections of the bearing structure component to yield a connection therewith. To this end, the downwardly projecting free ends of the profile sections of the interior bearing structure component preferably have outwardly projecting welding flange sections.

In another embodiment of the invention, it can further be provided that the floor plate is divided into a front surface segment to be joined with the front frame, and a rear surface segment to be joined with the rear frame of the body. This is advantageous from a manufacturing standpoint in that the front surface segment is preferably designed as a thermoformed part with a front attachment section for securing to the front frame, while the rear surface segment is largely even and flat except for the central tunnel section. Therefore, the rear surface segment is preferably to be designed as a roll-formed part, which has a constant cross sectional profile viewed in the longitudinal direction of the vehicle.

The front surface segment and rear surface segment are preferably joined together by means of a weld seam extending essentially in the transverse direction of the vehicle. The two-part floor plate formed in this way can then be joined as a whole with the bearing structure component to be designed in one piece and situated in the interior or dry area of the motor vehicle, in particular welded thereto.

Another advantageous embodiment provides for the use of cast components made out of a light metal, in particular out of aluminum or magnesium, for the interior bearing structure component. The interior bearing structure component is to be fabricated in particular using lightweight structural materials, in particular compression-hardened, high-strength steel sheet, as well as using aluminum or magnesium. In particular, the interior bearing structure component here lacks any corrosion protection, advantageously lacks any coating. Selecting suitable lightweight structural materials and omitting an otherwise conventional corrosion protection layer for the bearing structure component makes it possible to advantageously reduce the weight of the bearing structure component as well as the manufacturing outlay required for this purpose relative to prior art. In addition, using high-strength, e.g., compression-hardened steel sheet makes it possible to give it a comparably lower wall thickness or sheet thickness, which can lead to another savings in weight and material overall.

In addition, structure-reinforcing or structure-stiffening elements can be provided for both the bearing structure component and the floor plate. For example, these can be incorporated as reinforcing ribs or reinforcing beads, for example via corresponding embossing or thermoforming in roughly the form of stiffening or reinforcing beads.

Finally, the invention also relates to another embodiment, a motor vehicle with a bearing structure arrangement according to an embodiment of the invention described above.

Additional objectives, features and advantageous possible applications and configurations of the invention are outlined in the following description of an exemplary embodiment based on drawings. All features described in the text and graphically depicted on the figures here constitute the subject matter of the present invention, whether taken individually or in any logical combination with each other.

BRIEF DESCRIPTION OF THE DRAWINGS

The present invention will hereinafter be described in conjunction with the following drawing figures, wherein like numerals denote like elements.

FIG. 7 is a block diagram top view of the vehicle showing the bearing structure component incorporated therein.

DETAILED DESCRIPTION

Figure 1:
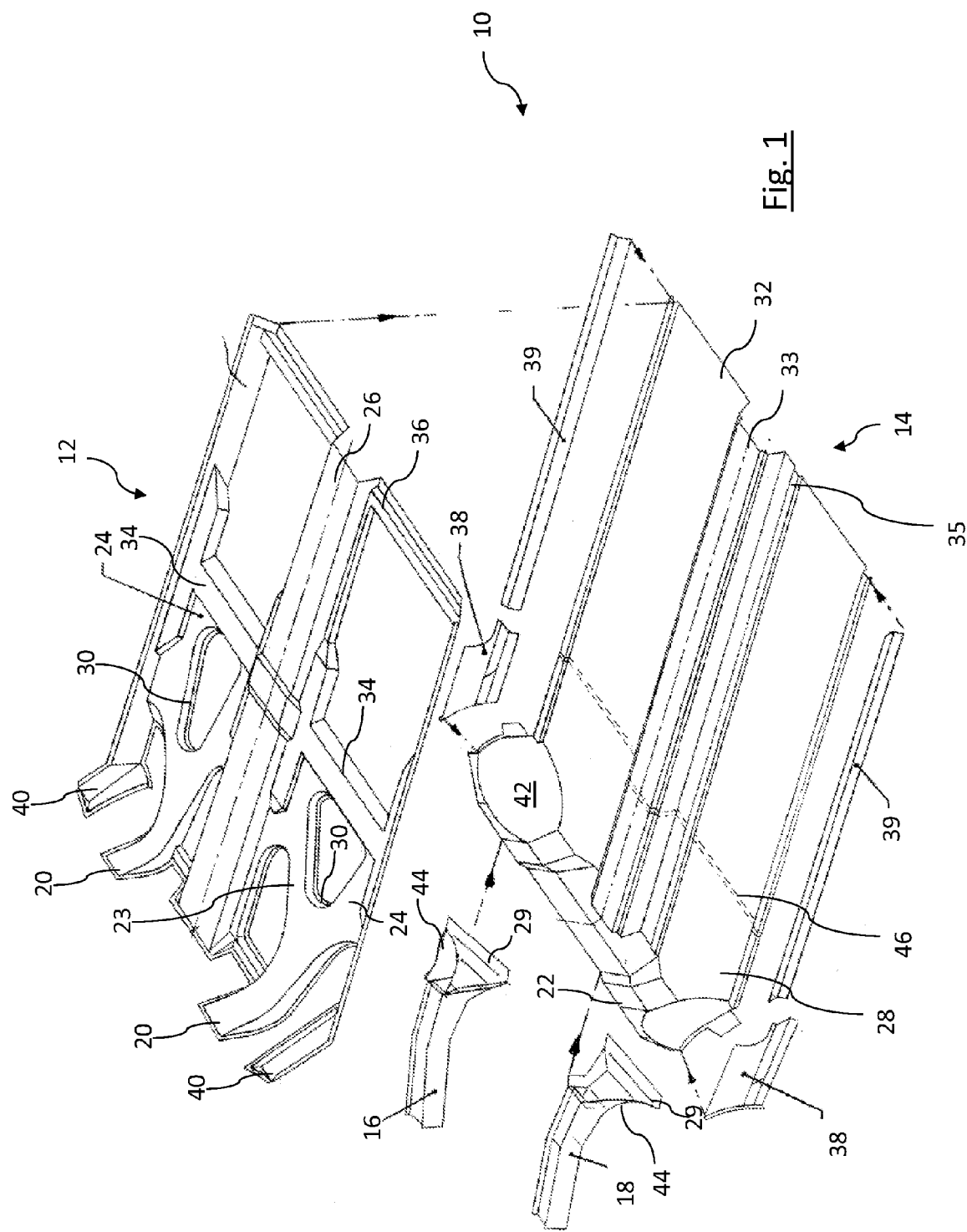
FIG. 1 is a perspective exploded view of the bearing structure arrangement according to an embodiment of the invention with an interior bearing structure component and underlying floor plate.

The following detailed description is merely exemplary in nature and is not intended to limit the invention or the application and uses of the invention. Furthermore, there is no intention to be bound by any theory presented in the preceding background of the invention or the following detailed description.

FIG. 7 shows an underbody structure 10 of a vehicle body 11, which abuts a front frame 16, 18 at the front, and a rear frame 17, typically a vertical sheeting or rear frame node of the vehicle body 11, toward the back. The underbody structure 10 is here essentially composed of an interior bearing structure component 12, i.e., situated in a dry area of the vehicle body 11, and a floor plate 14 connected with the bearing structure component 12.

The bearing structure component 12 extends essentially in the longitudinal direction of the vehicle. The bearing structure component 12 is of a one-piece construction and extends from the front frame 16, 18 to the rear frame 17, typically from a splash wall (not separately numbered) to a vertical sheeting (not separately numbered) of the vehicle body 11. As a result, the bearing structure component 12 spans the entire floor section 19 of the vehicle body 11 lying under a passenger cabin 21. The bearing structure component 12 may be directly or indirectly secured to the front frame 16, 18 of the vehicle body 11.

Referring now to FIG. 1, the interior bearing structure component 12 has a plurality of profile sections 20, 23, 24, 26, 34, 40 that converge or branch into each other. Nearly all of these profile sections 20, 23, 24, 26, 34, 40 have a downwardly open U-shaped cross section. These profile sections 20, 23, 24, 26, 34, 40 are welded with respectively underlying surface segments 28, 32 of the floor plate 14 by means of laterally protruding welding flange sections 30. Individual welding points or welding seams are denoted on FIGS. 5 and 6 by individual crosses in the overlapping area of individual profile sections 20, 23, 24, 26, 40.

The floor plate 14 has upwardly offset attachment sections 22, 42 toward the front, i.e., facing the front or splash wall of the vehicle body 11, against which correspondingly high-placed attachment sections 20, 40 of the interior bearing structure component 12 come to abut.

It is provided in particular that the cross sectional profile of a front attachment section 20 of the interior bearing structure component 12 ends up overlapping a cross section of the front frame 18 corresponding thereto at least partially, and preferably completely, wherein a high-placed attachment section 22 of the floor plate 14 between the attachment section 20 and front frame 18 acts as a hermetic separation between the splash water area and dry area of the vehicle body 11.

Figure 4:
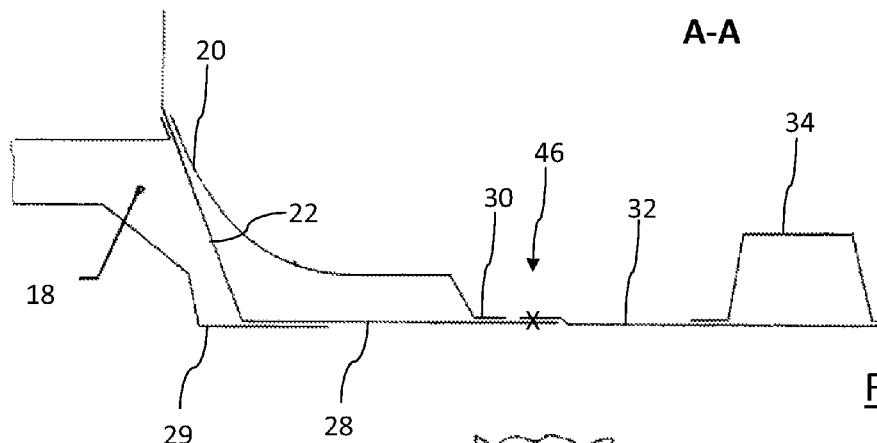
FIG. 4 is a cross section through the bearing structure component along the intersecting line A-A according to FIG. 2.

As depicted on FIG. 4, the attachment section 20 and front frame 18 largely overlap, so that the attachment section 20 of the bearing structure component 12 operatively interacts with the front frame 18 in essentially a load path-conveying manner. It is here further provided that the lower end of the front frame 18 has a projection 29 that acts as a receptacle, against which the floor plate 14 comes to abut with its front surface segment 28, where it is preferably welded with the receptacle 29.

Figure 5:
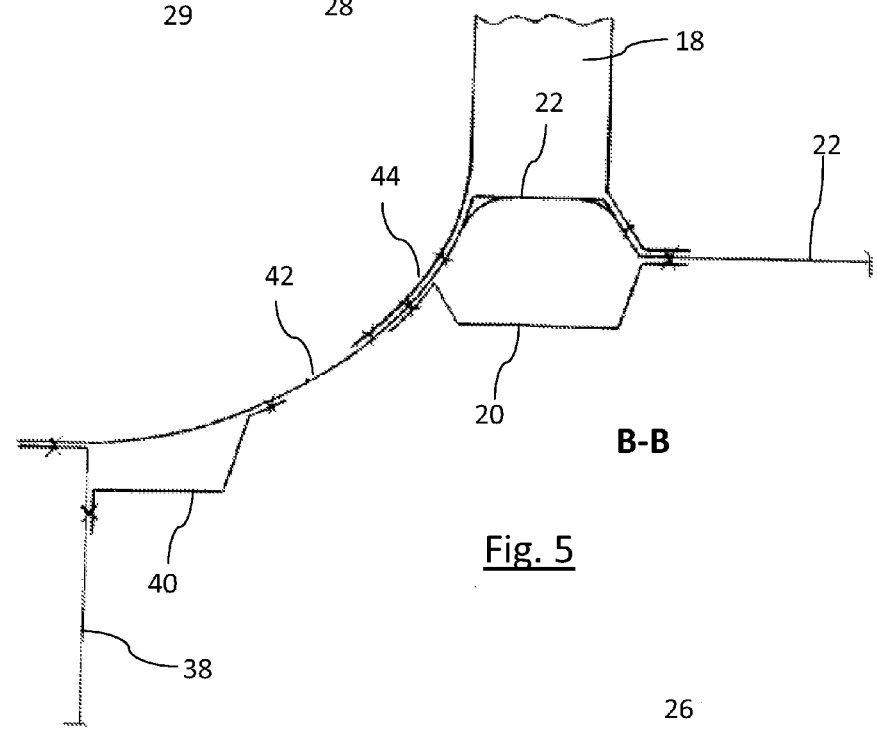
FIG. 5 is a cross section through the intersecting line B-B according to FIG. 2.

A curved attachment section 42 adjoins the high-placed front attachment section 22 of the floor plate 14, as evident from the cross section according to FIG. 5. Correspondingly with the above, the front frame 18 has a lateral elongation 44 that acts like a lateral receptacle, and is welded in the overlapping area of the curved attachment section 42 of the floor plate 14 and on the opposing side with an outwardly offset welding flange section of the high-placed attachment section 20 of the interior bearing structure component 12.

Figure 2:
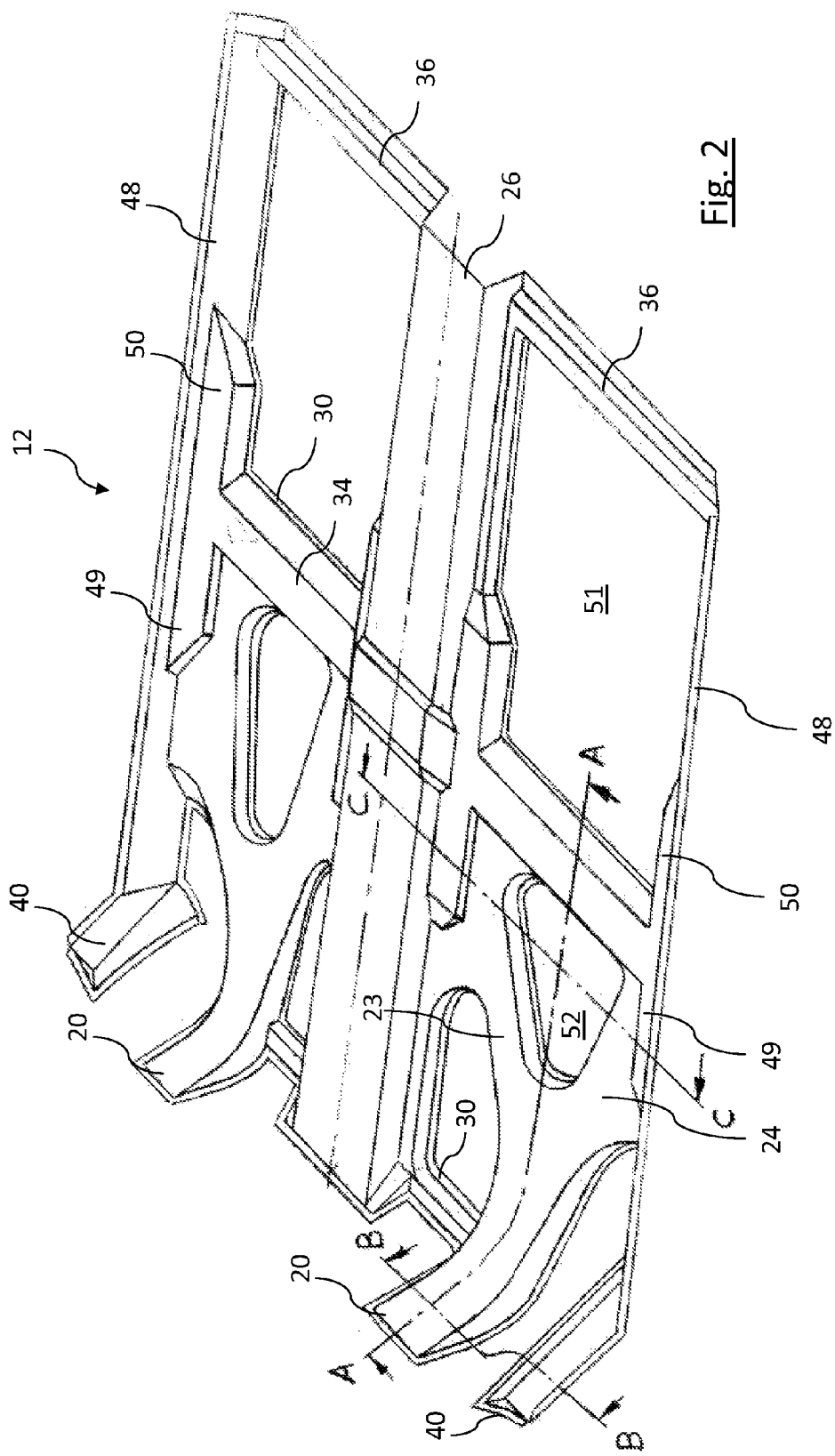
FIG. 2 is an isolated, perspective view of the interior bearing structure arrangement.

The front profile sections of the central tunnel 26 shown on the left of FIG. 2 as well as more outlying attachment sections 40 of the bearing structure component 12 shown in isolation on FIG. 2 are attached in a similar way to high-placed areas 22, 42 of the floor plate 14. As further evident from an overall examination of FIGS. 1 and 5, the front attachment section 40, which can simultaneously act as a footrest on the driver's side, is secured to the curved attachment section 42 of the floor plate 14 toward the front, i.e., toward the top on FIG. 5, but laterally to a reinforcement 38 arranged separately on the floor plate 14 as well as on the interior bearing structure component 12, preferably by means of welding.

This reinforcing component 38 acts as a quasi edge plate in the edge area of the underbody structure 10. In particular, the reinforcing element 38 is designed as a floor laterally in the front. A skirt reinforcement 39 also acting as an edge plate adjoins the lateral reinforcing plate 38 opposite the traveling direction, as evident from an examination of FIGS. 1 and 6. The skirt reinforcement 39 is generally also to be designated as being located on the floor to the side.

Figure 6:
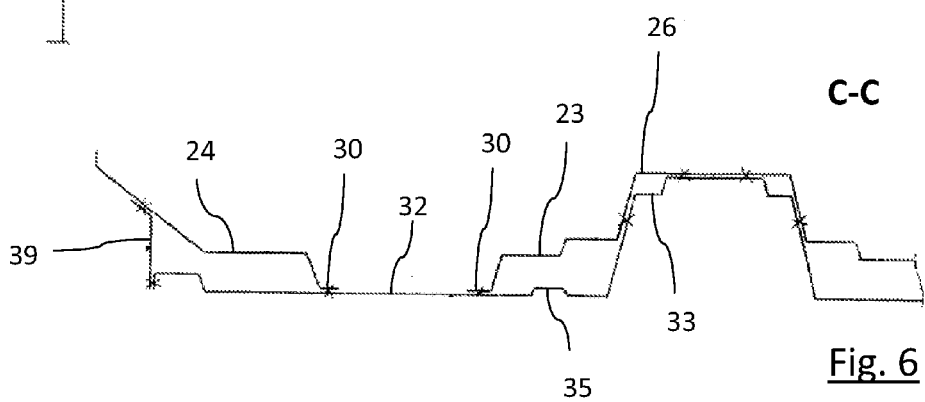
FIG. 6 is a cross section along the intersecting line C-C according to FIG. 2.

The cross section along the intersection line C-C according to FIG. 2 depicted on FIG. 6 illustrates that the U-profile shaped attachment section 20 of the interior bearing structure component 12 is divided into two branches 23, 24 opposite the traveling direction and directed toward the outside and inside, wherein the branch 24 extends outwardly toward the skirt reinforcement 39, and the branch 23 runs inwardly toward the central tunnel section 26. The branch 24, floor plate 32 and skirt reinforcement 39 together form an overall closed cross section profile in the outlying edge area. The branch 23 facing the central tunnel section 26 forms a comparably closed profile section together with the corresponding inwardly projecting tunnel section 33 of the floor plate 32, as evident from the cross section on FIG. 6.

Viewed in the longitudinal direction of the vehicle, the branch 24 running outwardly toward the skirt reinforcement 39 preferably passes as a single piece into a seat cross member 34. The seat cross member 34 also extends in the transverse direction of the vehicle as a kind of U-profile. The seat cross member 34 is here designed as a double T viewed from above in the transverse direction of the vehicle, and preferably passes over into the profile branch 24 as a single piece with a forwardly directed profile section 49 running essentially in the longitudinal direction of the vehicle.

The seat cross beam 34 passes over into an upwardly offset edge section 48 of the interior bearing structure component 12 with a profile section 50 designed correspondingly hereto and extending toward the rear opposite the traveling direction. In the illustrations on FIGS. 1 and 2, the free end of the interior bearing structure component 12 shown on the right has an attachment profile 36 for securing the bearing structure component 12 to a rear frame or rear frame node of the vehicle body not depicted on the figures.

The interior bearing structure component 12 shown separately on FIG. 2 has a free space 51 or direct passage to the underlying rear surface segment 32 of the floor plate 14 between the seat cross member 34 and the attachment profile 36 lying in the back, as well as between the lateral edge section 48 and the central tunnel section 26. The seat cross member 34, edge sections 36, 38 and central tunnel section 26 all preferably merge into each other as a single piece, and have a welding flange 30 that continuously borders the receptacle 51.

The situation is similar with respect to a receptacle depression 52 formed between the two profile section branches 23, 24 and the seat cross member 34. Here as well, the interior bearing structure component 12 is welded with the floor plate 14 or its front 28 and/or rear surface segment 32 by means of at least one welding flange 30 running self-contained in the plane of the floor plate 14.

As an advantageous result of the interior arrangement of the bearing structure component of an underbody structure of a motor vehicle chassis, the floor plate 14, and hence the underbody of the motor vehicle, can be lowered at least by the profile height of the bearing structure component 12. This yields free spaces 51, 52, which are available for accommodating insulation material, for example.

In addition, the bearing structure component 12 coming to lie in the interior or dry area of the motor vehicle can enable the problem-free use of lightweight structural materials, in particular of high-strength steel, but also of aluminum or magnesium cast components, which need not be protected against corrosion given their location in the dry area. Further, the one-piece design of a bearing structure component 12 extending essentially completely between the splash wall and vertical skirting or between the front frame 16, 18 and rear frame 17 makes it possible to reduce the overall number of components to be assembled.

By joining the interior bearing structure component 12 with the floor plate 14 and preferably with the skirt reinforcements 38, 39 laterally acting as the floor before installation in the motor vehicle, or prior to establishing a load-path conveying connection between the front and rear frame component, an underbody module 10 can be created, which in a few steps can be secured with the remaining components in a load-path conveying manner, for example the front frame 16, 18 and/or the rear frame 17 or rear frame node.

In addition, the one-piece configuration of the interior bearing structure component 12 increases the structural and torsional stiffness of the entire underbody structure 10.

Figure 3:
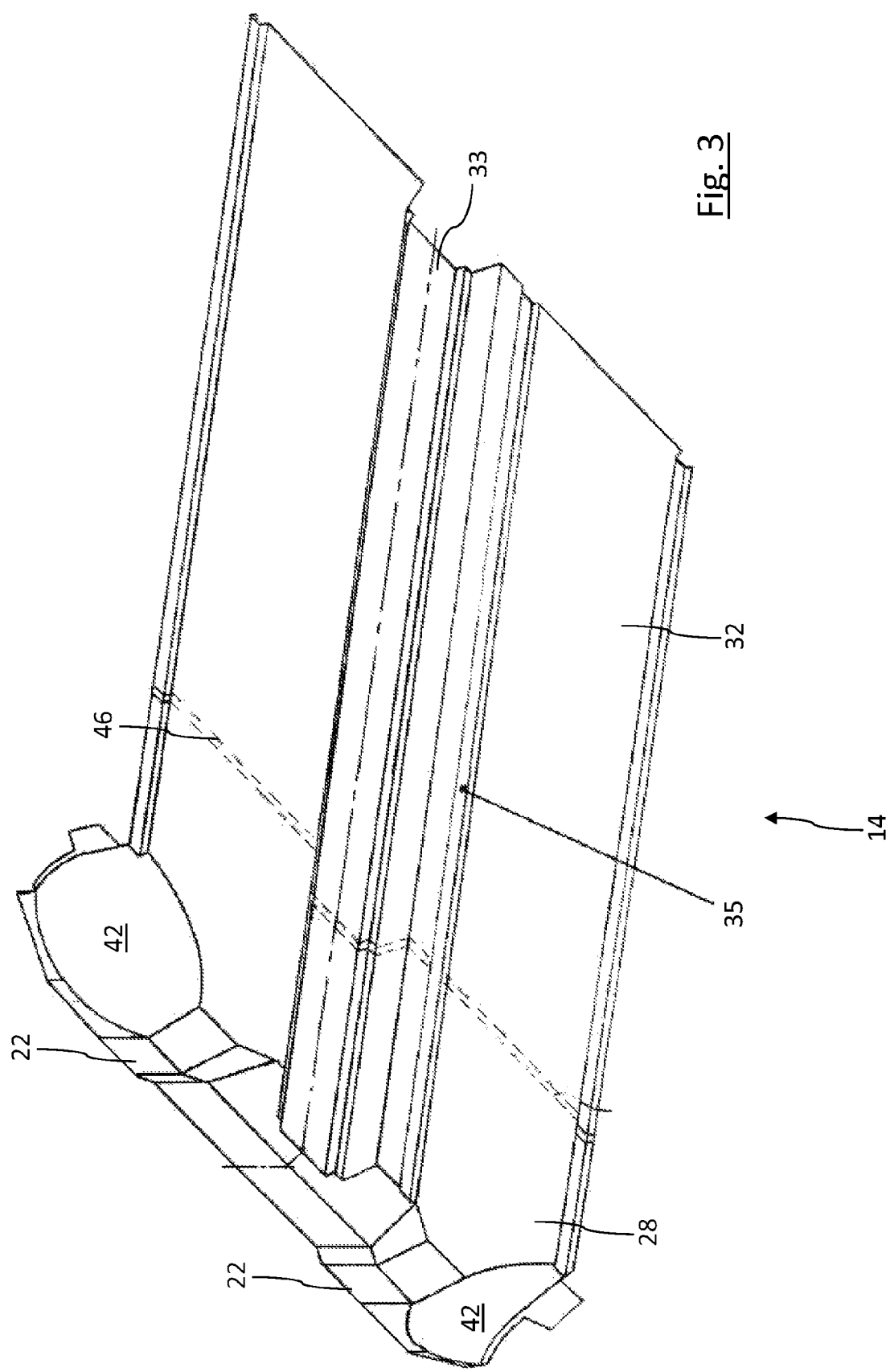
FIG. 3 is a correspondingly isolated, perspective view of the floor plate.

While the load path-conveying, internal bearing structure component 12 is preferably stamped, embossed and/or thermoformed out of a single sheet metal blank, the floor plate 14 to be placed underneath can be divided into two parts, specifically a front, preferably thermoformed floor segment 28 and a rear surface segment 32, wherein the rear surface segment can be designed more cost effectively as a roll-formed component given an essentially unchanged cross sectional profile in the longitudinal direction, as shown on FIG. 3. Both surface segments, the front and rear surface segment 28, 32, further have a stiffening or reinforcing bead 35 running over the entire floor plate 14.

As illustrated on FIG. 4, the front surface segment 28 and the rear surface segment 32 overlap in sections, and are welded together along a weld seam 46 running essentially in the transverse direction of the vehicle. It is here provided in particular that the rear segment 32 rebounds in the overlapping area, so that an essentially flush connection between the two surface segments 30, 32 can be established when viewed from outside, which can advantageously affect the aerodynamics of the motor vehicle.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

The invention claimed is:

1. An underbody structure of a body for a motor vehicle having a passenger cabin, the body including a front frame, a rear frame, and a floor section disposed under the passenger cabin, the underbody structure comprising:
   a bearing structure component extending essentially in a longitudinal direction of the motor vehicle to form a single-piece connection between the front frame and the rear frame and spanning the entire floor section;
   a floor plate disposed underneath the bearing structure component; and
   the bearing structure component having a front attachment section extending at an inclination or transverse to a plane of the floor plate via an attachment section of the floor plate that extends in a corresponding manner, the front attachment section of the bearing structure component configured for a connection in a load path-conveying manner with the front frame of the body.

2. The underbody structure according to claim 1, wherein the bearing structure component is disposed in a dry area of the motor vehicle.

3. The underbody structure according to claim 1, wherein the bearing structure component is disposed in an interior of the motor vehicle.

4. The underbody structure according to claim 1, wherein the bearing structure component comprises branching profile sections open toward the floor plate.

5. The underbody structure according to claim 1, wherein the bearing structure component includes a welding flange disposed in a plane of the floor plate, the welding flange connecting the bearing structure component with the floor plate.

6. The underbody structure according to claim 1, wherein the bearing structure component comprises a central tunnel section extending over a substantially entire length in the longitudinal direction of the motor vehicle.

7. The underbody structure according to claim 6, wherein side edges of the bearing structure component lying in a transverse direction of the motor vehicle comprise edge sections that are high-placed relative to a plane of a floor plate and situated opposite each other.

8. The underbody structure according to claim 7, wherein the bearing structure component comprises a seat cross member extending between the central tunnel section and edge section.

9. The underbody structure according to claim 7, wherein the edge sections of the bearing structure component and the floor plate are joined with lateral floor segments.

10. The underbody structure according to claim 1, wherein the bearing structure component is welded by a plurality of profile sections with a front surface segment and a rear surface segment of a floor plate.

11. The underbody structure according to claim 9, wherein the floor plate is welded by a plurality of profile sections with surface segments of the lateral floor segments.

12. The underbody structure according to claim 10, wherein the front surface segment is a thermoformed part, and the rear surface segment is a roll-formed part, and the thermoformed part and the roll-formed part are joined with a weld seam extending essentially in a transverse direction of the motor vehicle.

13. The underbody structure according to claim 1, wherein the bearing structure component is a high-strength steel sheet fabricated out of a light metal.

14. The underbody structure according to claim 13, wherein the light metal comprises aluminum.

15. The underbody structure according to claim 13, wherein the light metal comprises magnesium.

16. The underbody structure according to claim 1, wherein the bearing structure component is a cast component fabricated out of a light metal.

17. The underbody structure according to claim 16, wherein the light metal comprises aluminum.

18. The underbody structure according to claim 16, wherein the light metal comprises magnesium.

* * * * *